United States Patent [19]

Levine

[11] Patent Number: 5,339,337
[45] Date of Patent: Aug. 16, 1994

[54] PERMUTED BLOCK SYNCHRONIZATION

[75] Inventor: Stephen N. Levine, Itasca, Ill.

[73] Assignee: Motorola, Inc., Schaumburg, Ill.

[21] Appl. No.: 35,877

[22] Filed: Mar. 12, 1993

Related U.S. Application Data

[63] Continuation of Ser. No. 814,231, Dec. 23, 1991, abandoned, which is a continuation of Ser. No. 419,052, Oct. 10, 1989, abandoned, which is a continuation-in-part of Ser. No. 411,959, Sep. 25, 1989, abandoned.

[51] Int. Cl.$^5$ ............................................... H04L 7/04
[52] U.S. Cl. .................................... 375/114; 370/106
[58] Field of Search ................... 375/106, 114, 116; 371/42, 46, 47; 370/100.1, 105.4, 106

[56] References Cited

U.S. PATENT DOCUMENTS

| 3,662,114 | 5/1972 | Clark | 370/106 |
|---|---|---|---|
| 3,754,102 | 8/1973 | Clark | 370/106 |
| 3,812,430 | 5/1974 | Schmidt et al. | 375/107 |
| 4,353,130 | 10/1982 | Carasso et al. | 375/114 |
| 4,694,473 | 9/1987 | Etoh | 375/116 |
| 4,763,339 | 8/1988 | Sutphin et al. | 370/106 |
| 4,876,740 | 10/1989 | Levine et al. | 375/114 X |

Primary Examiner—Benedict V. Safourek
Attorney, Agent, or Firm—Raymond J. Warren

[57] ABSTRACT

There is provided a mechanism for block synchronization. It comprises: predeterminally arranging synchronization words about a point of interest, transmitting such arrangement, receiving that transmission having synchronization words predeterminally arranged about that point of interest, detecting at least part of those synchronization words, and locating the point of interest with reference to the arrangement of one detected word about another and their arrangement about the point of interest.

8 Claims, 3 Drawing Sheets

FIG.1

S S S S S S S S S | DATA MESSAGE

S 1 S 2 S 3 S 4 S 5 S | DATA MESSAGE

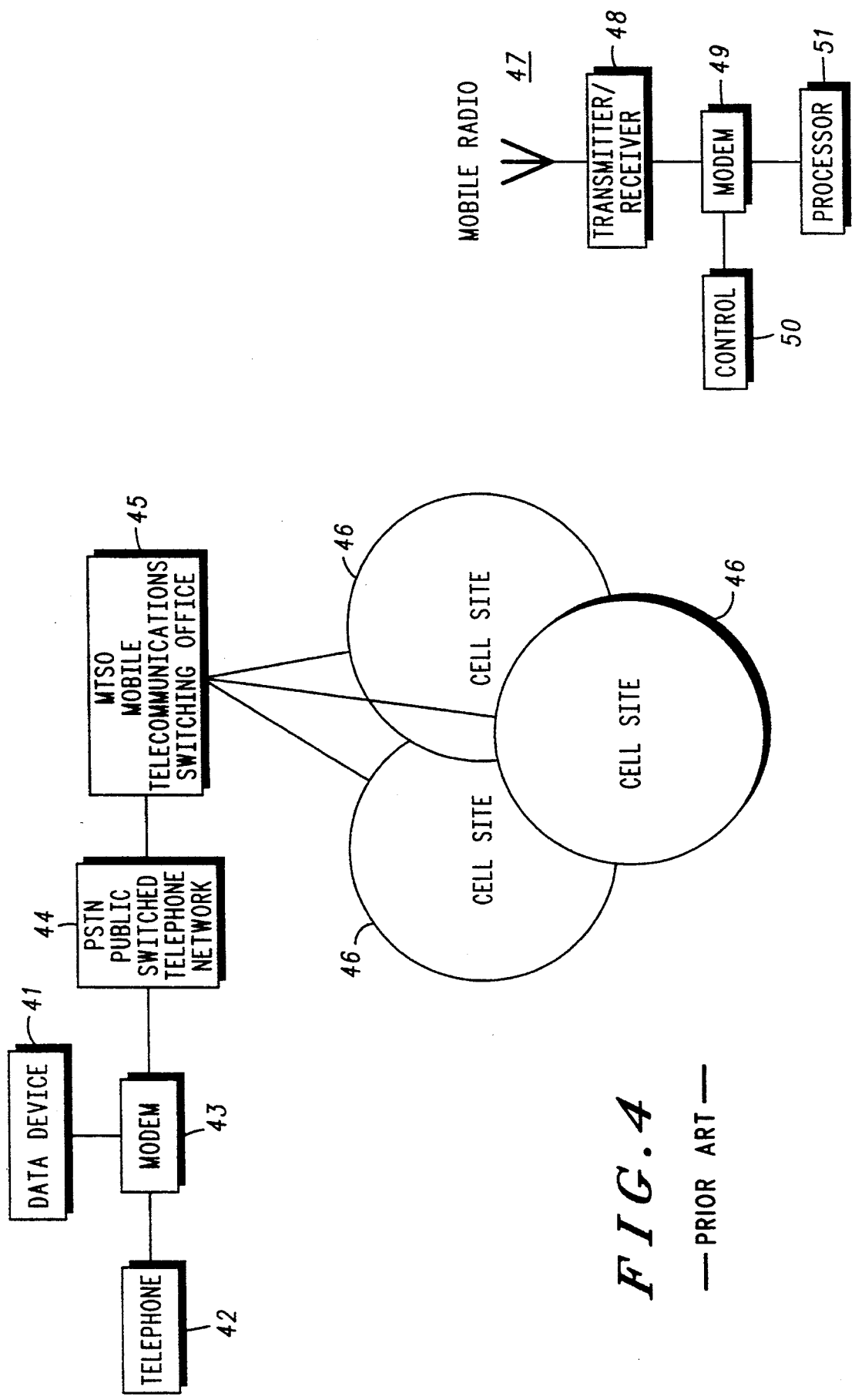
FIG. 4 —PRIOR ART—

PERMUTED BLOCK SYNCHRONIZATION

RELATED APPLICATIONS

This is a continuation of application Ser. No. 07/814,231, filed Dec. 23, 1991, now abandoned, which was a continuation of application Ser. No. 07/419,052, filed Oct. 10, 1989, now abandoned, which was a continuation-in-part of application Ser. No. 07/411,959, filed Sep. 25, 1989, now abandoned.

THE FIELD OF INVENTION

This invention is concerned with block synchronization in data transmission systems.

More particularly, this invention is concerned with block synchronization using permuted synchronization words.

BACKGROUND OF THE INVENTION

For a receiver to decode data messages transmitted to it, it must first locate the data in the transmission, known as block synchronization. Thus, long synchronizing sequences usually precede data so that the receiver can reliably correlate on the sequence and synchronize to the data. In radio environments where the signal is subject to fading, as in land-mobile radio, the signal may be lost during these long synch sequences and the receiver will have difficulty synchronizing to the data and recovering it.

U.S. Pat. No. 4,694,473 to Etoh attempts to solve this problem by preceding the data message by three different synchronization sequences. He locates the data in the transmission by reference to the known distance between the data and that sequence on which the receiver was able to correlate. The disadvantage in this approach is that it requires multiple correlators/correlations, three of them.

This invention takes as its object to overcome these shortcomings and to realize certain advantages presented below.

Rather than using multiple synchronization sequences and multiple correlators/correlations, this invention uses various permutations of a single synchronizing word (and its inverse), thereby using only one single correlator/correlation.

SUMMARY OF THE INVENTION

There is provided a mechanism for block synchronization. It comprises: predeterminally arranging synchronization words about a point of interest, transmitting such arrangement, receiving that transmission having synchronization words predeterminally arranged about that point of interest, detecting at least part of those synchronization words, and locating the point of interest with reference to the arrangement of one detected word about another and their arrangement about the point of interest.

DESCRIPTION OF THE DRAWINGS

Additional objects, features and advantages of the invention will be more clearly understood and the best mode contemplated for practicing it in its preferred embodiment will be appreciated (by way of unrestricted example) from the following detailed description, taken together with the accompanying drawings in which:

FIG. 1 is an illustration of permuted synchronization according to the invention.

FIG. 2 is a word permutation tree according to the invention.

FIG. 4 is a prior art schematic view illustrating a data communication system in mobile radio.

FIG. 5 is an illustration of synchronization words provided in relation to a data message according to the invention.

DETAILED DESCRIPTION

Figure 3:
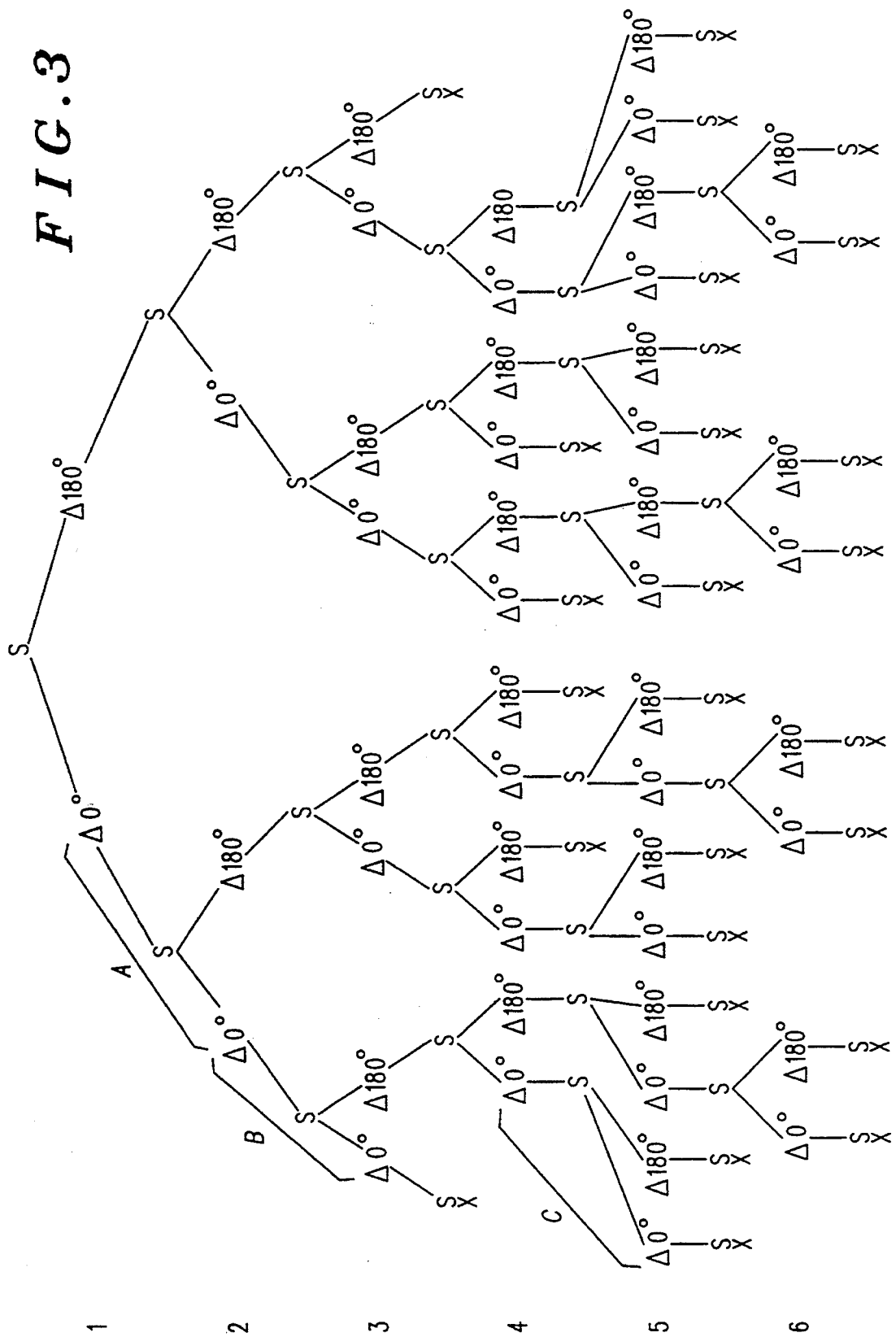
FIG. 3 is a relative phase permutation tree according to the invention.

FIG. 1 is an illustration of permuted synchronization according to the invention.

FIG. 1 illustrates a data message preceded by all eight possible permutations of a synchronization word (S) and its bit-wise inverse (S̄)—two words taken three at a time consecutively, or $2^3 = 8$. That is, SSS
SSS
SSS
SSS etc., resulting in the overlapping composite of:

SSSSSSSSS that contains all eight permutations, each permutation being unique and unambiguous. (In fact, it can be shown that if the first eight words are cyclically rotated and then the resultant first two words are appended to the rotated eight, than an equally acceptable initialization vector is generated, or more generally, where J is the number of available words to be permuted and N is the number of consecutive word detections, then the first $J^N$ words may be cyclically rotated and the resultant most significant $N-1$ words appended to generate a maximal length initialization vector of $J^N + N - 1$. This cyclical property cna be advantageously utilized to cause receivers having cylindrical rotations of this vector to look for the data of interest to begin at a different, and potentially incorrect locations.)

The $2^3$ scheme presented above would correspond to a detection criterion that three consecutive words must be detected to establish the one-in-eight unambiguous permutation (and its corresponding characteristic distance from the data of interest). To reliably detect the synchronization word or its inverse, the word should have high auto-correlation characteristics and low cross-correlation characteristics with respect to its inverse, as is well understood by those ordinarily skilled in this field. Thus, on a synch word of say 21 bits, 3 correlation errors or less would correlate to S while errors of 18 or more ( in the very same correlator/correlation) would correlate to the inverse, S̄. Accordingly, only one correlator/correlation is required to detect one synch word and its inverse. Similarly, only two correlators/correlations are required to correlate to four words, X, X̄, Y, and Ȳ.

FIG. 2 is a word permutation tree according to the invention. It illustrates that any given word may be followed by any other available word (i.e., S or S̄); thus, if the first word is S, it can be followed by either S (moving to the left) or S̄ (moving to the right), which in turn, can be followed by either S or S̄. If the detection criterion is that the data must be locatable from the detection of any two consecutive words, then no identical pairs of two consecutive words can exist; otherwise, one would not know which of the two pairs should be used to locate the information. Each X in FIG. 2 represents a permutation that should not be allowed to exist if our detection criterion is not to yield ambiguous results. Accordingly, if pair B were allowed amd facding caused node 1 of pair A to have been lost, the pair $\underline{SS}$ alone would not permit you to determine whether you were now at node 2 (via node 1) or node 3 (via node 2). Thus, node 3 would be disallowed permutation and is, therefore, maked X; likewise, pair C in view of pair A. As a result, to comply with this detection criterion, the maximum length initialization vectors where any conservative pair of words would unambiguously locate the data would be: $\underline{SSSSSS}$ or its cyclical rotation: $SS\underline{SSS}$; a complementary tree beginning with S would also exist, having their two inverses, $SSS\underline{SS}$ and $SSSS\underline{S}$.

Let's say that the initialization vector $SS\underline{SSS}$ is the one of those four selected as the predetermined arrangement to precede the data. Although the synch word, S, is itself a 21-bit string, this initialization vector could be more simply represented in memory by a minimum number of bit symbols, $S=0_2$, $\underline{S}=1_2$. The decoded initialization vector would then be reduced to $00110_2$. If, let's say two consecutive words, $01_2$, were detected, the actual distance from the detected pair to the data is proportional to the intersymbol distance that the detected symbols, $01_2$, must be advanced along the initialization vector symbols $00110_2$, until a match is found. (The physical implementation would, of course, be through a table and the distance from the beginning of that table to the corresponding index into that table. The same table, with differing beginning pointers, could be used by the transmitter and receiver to simplify both the encoding and decoding, particularly in cyclical rotations for encryption applications.)

Thus, using only one correlator/correlation, and two words (one synch pattern and its inverse), the location of data can be unambiguously established from the unique permutation detected from any two consecutive words.

In QAM phase-modulated systems, rather than differentiating synch words by their high positive and negative (inverse) bit correlations, a single synch word, S, could be differentiated by the absolute phase associated with its complex correlation. Thus, where transmitter and receiver I/Q channels are phase-synchronized, $\underline{S}$ would be logically equivalent to synch pattern S (ref: zero degrees) rotated by 180 degrees (in $\pi/4$ QPSK quadrature modulation, four words X, $\underline{X}$, Y, and $\underline{Y}$, are easily modeled using one synch pattern, no inverses, but four phases).

Where the transmitter and receiver are not phase-synchronized, the relative phase shift in complex-correlation from word-to-word can be used to differentiate the words instead. A phase shift is introduced by inserting, between words, bits whose sole function is to rotate the relative phase of the following word. FIG. 3 is a relative pahse permutation tree according to the invention. In the same manner and under the same detection criterion as FIG. 2, FIG. 3 illustrates, moving to the left, S transmitted at zero degrees relative phase shift with respect to the first and, moving to the right, S transmitted at 180 degrees relative phase shift. If, $S=\Delta 0$ (no phase word to word) and $\underline{S}=\Delta 180$ (180 degree phase change word), the four maximum length initialization vectors in the relative phase domain are, as illustrated:

| Δ180 | Δ180 | Δ0 | Δ0 | Δ180 | (corresponding to $SSSS\underline{S}$) |
| Δ180 | Δ0 | Δ0 | Δ180 | Δ180 | (corresponding to $SSS\underline{SS}$) |
| Δ0 | Δ0 | Δ180 | Δ180 | Δ0 | (corresponding to $SS\underline{SS}S$) |
| Δ0 | Δ180 | Δ180 | Δ0 | Δ0 | (corresponding to $S\underline{SS}SS$ | as in the bit-domain of FIG. 2).

Thus, there has been provided a mechanism for block synchronization. It comprises: predeterminally arranging permutations of synchronization words about a point of interest, transmitting such arrangement, receiving that transmission having permuted synchronization words predeterminally arranged about that point of interest, detecting at least part of certain permutations of those synchronization words, and locating the point of interest with reference to the permutation of one detected word about another and their arrangement about the point of interest.

The attendant advantages of this invention include a substantial reduction in the number of correlators or vorrelations required for detection and greater immunity to faded or otherwise lost signals. As a further advantage, it is well understood by those ordinarily skilled in this field how to construct the means for carrying out this methodology. For example, the apparatus of Etoh (U.S. Pat. No. 4,694,473) is easily adaptable to the methodology disclosed herein by the ordinary artisan.

FIG. 4 is a prior art block diagram of a communication system which utilizes the above described process. FIG. 4 illustrates a data communication system in mobile radio, designated at 41 is a computer (data device), 42 is a telephone set, 43 is a land modem, 44 is a public switching telephone network, 45 is a mobile telecommunications switching office (MTSO), 46 is a cell site, 47 is a mobile, 48 is a mobile telephone transmitter/receiver unit (TRU), 49 is a cellular modem, 50 is a control unit (CU), and 51 is a computer. The above members from the computer 41 to the cell site 46 are located on the land side, while those from the TRU 48 to the computer 51 are carried on the mobile 47.

Referring to FIG. 4, data communication between the data device 41 on the land side and the computer 51 carrier on the mobile 47 will be described. Although the data device 41 and the telephone set 42 are connected with the land modem 43, the data device 41 is connected with the land modem 43 by switching the system to a data mode. Data from the data device 41 is supplied in a block unit to the land modem 43 in which it is subjected to error correction encoding, and then fed to the public switching telephone network 44. The data is further allowed to pass, via MTSO 45 and the cell site 46, through a radio communication interval, and received by the mobile phone transmitter/receiver unit (TRU) 48 of the mobile 47. The received data is subjected to decoding, etc., by the cellular modem 49 which then delivers the data to the computer 51 as the data is decided to be normal. Provided that the received data is decided to be an erroneous one, the mobile side requests the land side to retransmit the same block data. Effecting the above procedure in repetition block data is transferred from the computer 41 on the land side to the cellular modem 49 of the mobile 47. The same procedure is effected also when, in contrast with the situation, data is transmitted from the computer 51 of the mobile 47 to the data device 41 on the land side. Moreover, communication can also be achieved by phone between the telephone set 42 and the control unit (hand set) 50 of the mobile 47.

While the preferred embodiment of the invention has been described and shown, it will be appreciated by those skilled in this field that other variations and modifications of this invention may be implemented. Although the permutation tree gets far more complex, the invention accommodates various detection criterion; for example, initialization vector SSSS satisfies the detection criterion that ANY two (including nonconsecutive) detections unambiguously locate the data, i.e., DDX, DXD, XDD, OR DXXD, where D indicates a detection and X indicates a missed detection or "don't care". Similarly, Δ+90 Δ−90 Δ180 and Δ0 satisfies the detection criteria: DD, DXD, and DXXD.

In the same spirit as that of the foregoing invention, the information between synchronization words could embed information about where the data message begins. This embodiment is illustrated in FIG. 5. A variable time delay (a variable number of bits) could be interleaved between successive repetitions of a single synchronization word (S). Thus, in the following initialization vector:

S 1 S 2 S 3 S 4 S 5 S DATA MESSAGE the numerals between successive synchronization words (S) indicates the number of delay bits between sync words. Since each two successive synch words has a unique characteristic delay between them, the beginning of the data message can be unambiguously located from the detection of the delay between any two successive synch words. Moreover, since the delay is cumulative (22 bits to the second synch, 23 between the second and third, 45 between the first and third, 47 between the second and fourth, etc.), the data can be unambiguously located from the detection of ANY two synch words. The bits so interleaved, more than functioning as mere place-holders, could be utilized to carry other information; thus, 1+2+3+4+5 or 15 bits of information could be encoded in the delay bits themselves.

Although this technique has been presented utilizing a single sync word (S) having high autocorrelation properties to reduce the number of correlators/correlations, it need not be so limited. These and all other variations and adaptations are expected to fall within the ambit of the appended claims.

What we claim and desire to secure by letters Patent is:

1. A method of synchronization comprising:
   predeterminally arranging synchronization words in a signal in relation to an information of interest,
   transmitting such arrangement,
   receiving that transmission having synchronization words predeterminally arranged in relation to that information of interest,
   detecting at least certain of those synchronization words and their arrangement with respect to one another,
   and synchronizing to the information of interest using the detected arrangement of one detected word in relation to another and their arrangement in relation to the information of interest.

2. A method as claimed in claim 1 wherein the step of predeterminally arranging comprises the step of spacing the synchronization words variably in relation to the information of interest.

3. A method of synchronization comprising:
   receiving a transmission having synchronization words predeterminally arranged in relation to information of interest,
   detecting at least certain of those synchronization words and their arrangement with respect to one another,
   and synchronizing to the information of interest using the detected arrangement of one detected word in relation to another and their arrangement in relation to the information of interest.

4. A method as claimed in claim 3 wherein synchronization words are variably spaced in relation to the information of interest.

5. A method of synchronization comprising the steps of:
   arranging a first, a second, and a third synchronization word in a data transmission;
   transmitting the data transmission from a transmitter;
   receiving the data transmission at a receiver;
   detecting the first and third synchronization words;
   determining the arrangement of the first to the third synchronization words; and
   synchronizing the receiver based upon the arrangement.

6. A method of synchronizing a data transmission containing an information of interest comprising the steps of:
   inserting a first synchronization word in the data transmission;
   inserting a second synchronization word in the data transmission a first predetermined distance from the first synchronization word;
   inserting a third synchronization word in the data transmission a second predetermined distance, different from said first predetermined distance, from the second synchronization word;
   transmitting the data transmission from a transmitter;
   receiving the data transmission at a receiver;
   detecting one of said first, second, and third synchronization words;
   detecting another of said first, second, and third synchronization words;
   determining a distance between the detected synchronization words; and
   synchronizing to the information of interest using said first detected synchronization word and said determined distance between the detected synchronization words.

7. The method of claim 6 wherein the first, second, and third words each consists of a first bit pattern.

8. A method of synchronizing a data transmission containing an information of interest comprising the steps of:
   inserting a first synchronization word having a first bit pattern in the data transmission;
   inserting a second synchronization word having said first bit pattern in the data transmission a first predetermined distance from the first synchronization word;
   inserting a third synchronization word having said first bit pattern in the data transmission a second predetermined distance, different from said first predetermined distance, from the second synchronization word;
   transmitting the data transmission from a transmitter;

receiving the data transmission at a receiver;

detecting one of said first, second, and third synchronization words;

detecting another of said first, second, and third synchronization words;

determining a distance between the detected synchronization words; and synchronizing to the information of interest using said first detected synchronization word and said determined distance between the detected synchronization words.

* * * * *